United States Patent [19]
Douhairet et al.

[11] Patent Number: 5,147,253
[45] Date of Patent: Sep. 15, 1992

[54] VARIABLE SPEED TRANSMISSION DEVICE

[75] Inventors: Louis Douhairet, Saint-Leger-Des-Vignes; Daniel Play, Saint-Genis-Les-Ollieres; Roger Trinquard, Saint-Leger-Des-Vignes, all of France

[73] Assignee: Caoutchouc Manufacture et Plastiques, Versailles, France

[21] Appl. No.: 678,827

[22] Filed: Apr. 1, 1991

[30] Foreign Application Priority Data

Apr. 2, 1990 [FR] France .................. 90 04162
Apr. 2, 1990 [FR] France .................. 90 04163

[51] Int. Cl.⁵ ............................................. F16G 5/16
[52] U.S. Cl. .................................................. 474/242
[58] Field of Search .............. 474/201, 237, 242–245, 474/265, 268

[56] References Cited

U.S. PATENT DOCUMENTS

4,303,403 12/1981 Lamers .................. 474/242 X
4,371,361 2/1983 Giacosa .................. 474/242 X

*Primary Examiner*—Thuy M. Bui
*Attorney, Agent, or Firm*—Nils H. Ljungman and Associates

[57] ABSTRACT

A flexible transmission device for continuously variable transmissions comprises an endless flexible connecting element and a plurality of transverse links. Each link includes at least one groove into which is engaged the flexible connecting element. The transmission element operates dry, without lubrication. The transmission stirrups, or links, of the transmission element are arranged around an endless core. The endless core is configured in the form of a V-belt. The endless core has oblique walls in contact with interior surfaces of the stirrups or links. The exterior oblique surfaces of the stirrups or links, are in contact with the flanges of the transmission pulleys.

20 Claims, 6 Drawing Sheets

VARIABLE SPEED TRANSMISSION DEVICE

BACKGROUND OF THE INVENTION

1. Field of the Invention

The present invention relates to the field of variable speed mechanical power transmission systems, which systems include a mechanism for the transmission of power between grooved pulleys wherein the transmission system includes at least one endless belt having a plurality of transverse links positioned thereon. Such systems include flexible elements, or belts, that operate by dry adherence, that is, without externally provided lubrication between the grooved pulleys. The belt may include an interior V-shaped endless loop with a plurality of thrust links positioned thereon. The grooved pulleys may have fixed cheeks or flanges, or also, as is often used in variable speed transmissions, the pulleys may have movable cheeks or flanges. Both types of pulleys and/or transmissions are encountered in automotive applications and on agricultural and industrial equipment.

The variable feature of such systems is achieved by relative displacement between the pairs of cheeks, or flanges, of one or more pulleys of the system. Such systems may employ drive and/or receiver pulleys that have conical belt engagement surfaces to provide variable diameters thereof. Such systems may operate by dry mechanical adherence. The power transmission element in the form of a flexible belt transfers mechanical power between the pulleys of such transmission systems. The belt includes an interior endless loop.

2. Background Information

This application claims priority from French Patent Application No. 9 004 162. French Patent Application No. 9 004 162, in turn, is a Certificate of Continuation filed pursuant to a French principal application filed Jan. 11, 1988. This French principal application filed Jan. 11, 1988 is identified as French Patent Publication No. 2 625 783 and French Application Serial No. 88 00244 ("FR '244") and is entitled "Transmission Mechanism for Infinitely Variable Transmission With Transverse Thrust Links and Flexible Core, Operating by Dry Friction." U.S. Pat. No. 4,968,288, issued Nov. 6, 1990, ("U.S. '288") claims priority from FR '244.

The list of prior art described in U.S. '288 can be supplemented by the addition of West German Patent Publication No. 2,557,724. West German Patent Publication No. 2,557,724, assigned to Hans Heynau GmbH, discloses links of transmission elements having matching contact surfaces between the links. The matching contact surfaces are provided to ensure transverse integrity, solidarity, adherence and/or contact among the links.

French Patent Publication No. 2,540,953, assigned to Regie Nationale Des Usines Renault et Compagnie Des Produits Industriels De L'Ouest, discloses a transmission system having links. The links have centering pins and matching holes to ensure the transverse integrity, solidarity, adherence and/or contact between staples and/or riders of the system. Characteristics of this transmission system include the configuration of the contact surface of the links and the configuration of the band that forms a flexible core of the system.

European Patent Publication No. 0,073,962, assigned to Nissan Motor Company, Limited, discloses staples and/or riders, formed by blocks that are positioned sequentially in a first position and a second position relative to an endless band, or belt. The second position is rotated 180° from the first position about the axis. The axis is perpendicular to the longitudinal plane defined by the endless band. The blocks are equipped with pins and holes. The blocks are relatively positioned such that the pins of one block fit within the holes of an adjacent block.

U.S. Pat. No. 4,433,965 to Hattori is assigned to Nippondenso Co. Ltd., and U.S. Pat. No. 4,610,648 to Miranti is assigned to Dayco Corporation. These two U.S. patents disclose transmission systems having flexible cores. The flexible cores include flat belts that support links. The links are constructed of modified polymers or composites and are reinforced, as necessary, with short fibers.

In summary, all of the above-cited patent documents relate, essentially, to a flexible belt having a flexible core. The flexible core being a flat band, strip, or superimposition or stack of metal bands.

In actual use, all of the devices disclosed in the above-recited patent documents are extremely unstable when the power belt is traveling in the straight line portion of its trajectory, such as between two pulleys. The instability is the result of thrust on and/or through the belt. Such thrust is exerted by reciprocal contact between the aligned links of the belt. This problem of instability was already known at the time of the filing of FR '244. The particular embodiment of the invention shown in FIG. 7 of FR '244 and the subject of Claim 22 of FR '244 attempted to remedy such instability.

During actual use of the device of FIG. 7 of FR '244, however, it was determined that even the coincidence between the imaginary, or predicted, original line of travel of the thrust links and the travel of the neutral fiber of the loop did not ensure stability of the device. Therefore, the stability of the device may be inadequate when significant and high mechanical power must be transmitted through the device.

OBJECTS OF THE INVENTION

One object of the present invention is to provide an improved variable speed power transmission belt that solves the problems of the prior art by providing stirrups or links for variable speed transmissions, such as the transmissions disclosed in FR '244, so that the transmission element provides improved and stable performance. Another object of the present invention is to provide a loop for a belt. Additionally, another object of the present invention is to provide a functional configuration of the contact zone between the loop of the belt and the thrust links positioned on the loop Further, another object of the present invention is to provide a functional design of the thrust links of the belt.

SUMMARY OF THE INVENTION

The present invention provides a more stable transmission system than known systems. The present invention provides a belt that employs as a core a V-belt of conventional dimensions. The V-belt may have a trapezoidal cross sectional configuration. The V-belt shaped loop takes place between surfaces having little or no relative movement therebetween. Such contact between surfaces makes possible an improved distribution of stresses in the belt and, consequently, reduces heating of the belt during operation.

The present invention includes a belt for an infinitely variable transmission employing transverse thrust links.

The thrust links are similar to those disclosed in FR '244. The present invention provides an improvement over the belt disclosed in FR '244 in that the loop is a V-belt having oblique walls. The oblique walls of the V-belt are in contact with the interior surfaces of the stirrup shaped thrust links. The thrust links are positioned on, and surround at least a portion of the V-belt. The exterior oblique surfaces of the links, in turn, are configured to come into periodic contact with the cheeks, or flanges, of the transmission pulleys of the transmission systems in which the pulleys are employed.

In summary, one aspect of the invention resides broadly in a continuously variable speed transmission comprising: a drive pulley; a driven pulley; each of the drive pulley and the driven pulley having conical surfaces to provide variable diameters thereof; a transmission mechanism extending around each of the drive pulley and the driven pulley; the transmission mechanism including at least one endless flexible connecting element; the endless flexible connecting element defining a generally trapezoidal cross section; the transmission mechanism including a plurality of links mounted on the endless flexible connecting element; and each of the links including at least one groove means for receipt of the endless flexible connecting element therein.

Another aspect of the invention resides broadly in a continuously variable speed transmission belt for a continuously variable speed transmission, the transmission having a drive pulley and a driven pulley, the transmission belt for extending movably around the drive pulley and the driven pulley, the drive pulley for driving the driven pulley by the transmission belt, the belt comprising: a flexible loop of material; the flexible loop having a substantially trapezoidal cross section; a plurality of substantially rigid links mounted on the flexible loop; the links each defining a cavity for receiving a portion of the flexible loop, the cavity being configured to correspond substantially to a portion of the flexible loop cross section; the links each having an exterior perimeter surface defining an at least partially trapezoidal cross section; each link having opposed contact surfaces connected to the exterior perimeter surface; each link contact surface for being in removable contact with an adjacent the contact surface of an adjacent link; each link contact surface being configured to push the adjacent contact surface of the adjacent link to move the belt along the path of travel; a flexible cover substantially surrounding the exterior perimeter surface of each link; and the flexible cover extending generally continuously along generally the entire length of the belt.

BRIEF DESCRIPTION OF THE DRAWINGS

The present invention may be understood with reference to the accompanying drawings, in which.

DESCRIPTION OF THE PREFERRED EMBODIMENTS

Figure 1A:
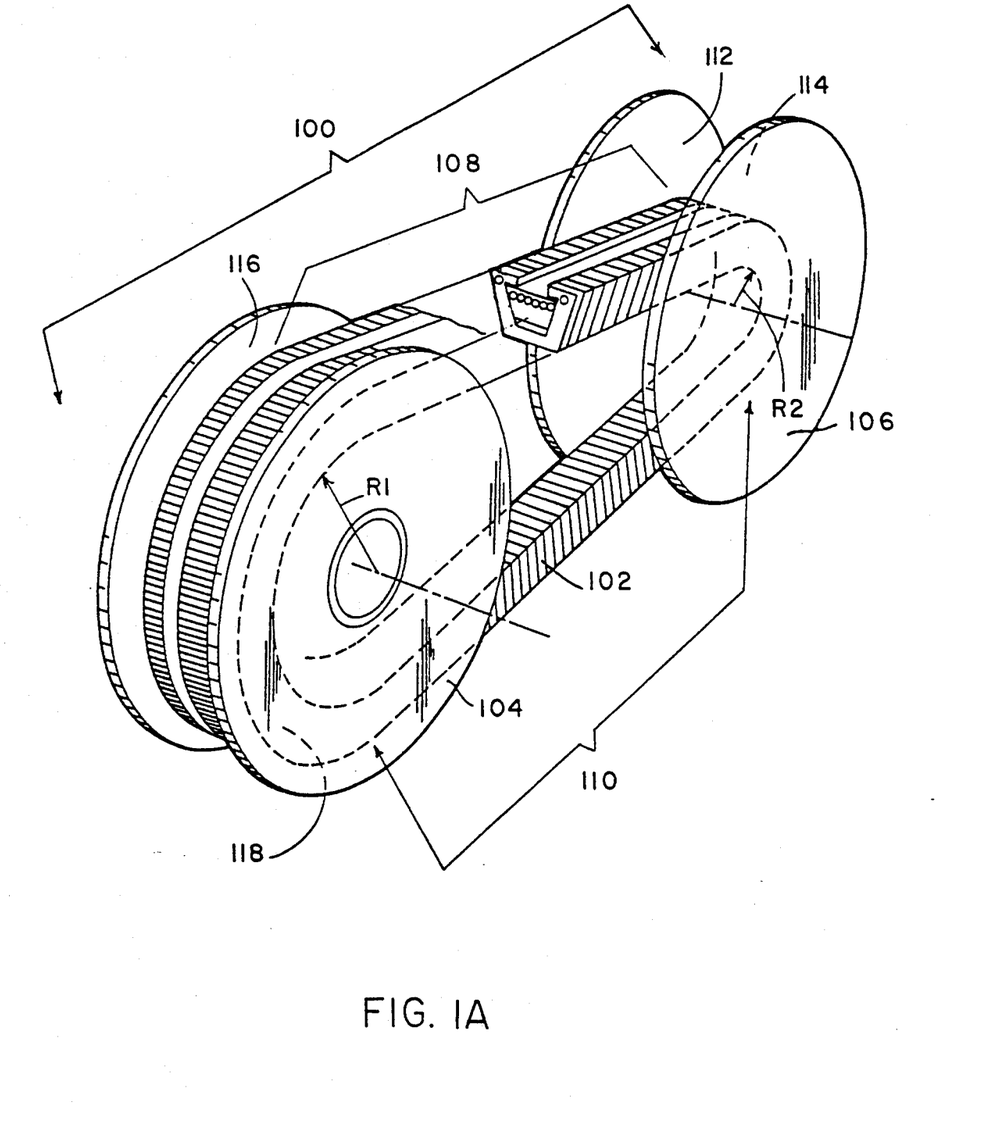
FIG. 1A is a perspective view showing a transmission system that operates by dry mechanical adherence and employs a belt of the present invention.

FIG. 1A shows power transmission system 100. Transmission system 100 includes belt 102. Belt 102 is positioned on, and travels between, pulleys 104 and 106. One of pulleys 104 and 106 may be a drive pulley while the other of pulleys 104 and 106 may be a receiver pulley.

Figure 1B:
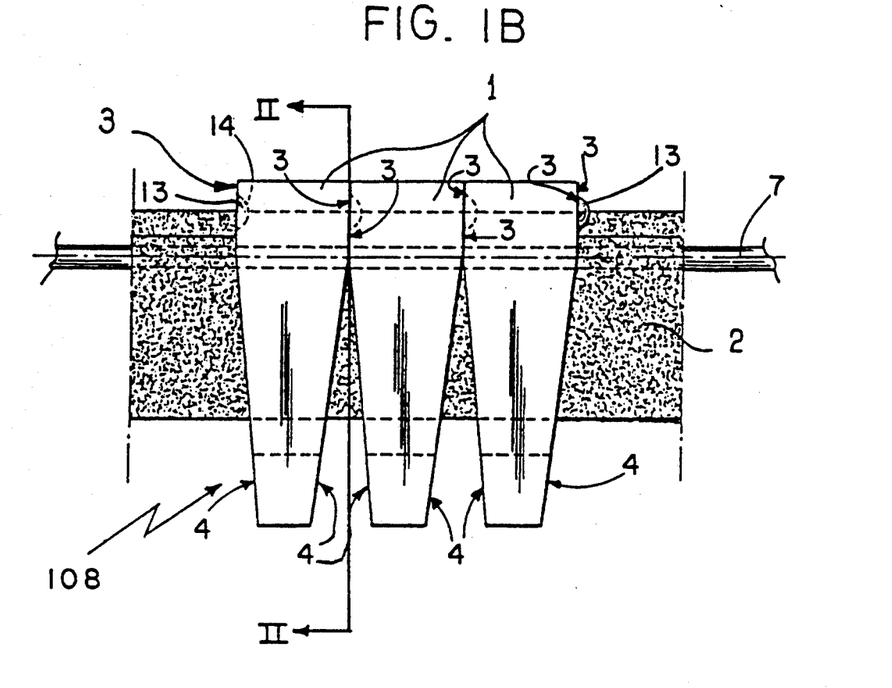
FIG. 1B is a side elevational view, partially in section, showing several links of the belt of the present invention wherein the links are positioned on a portion of a loop.

FIG. 1B shows an assembly of several transversally rigid links 1. Links 1 are assembled in alignment on loop 2. The portion of belt 102 shown in FIG. 1B corresponds to a portion of straight line trajectory portion 108 of transmission element 102 (See FIG. 1A). The transmission ratio of transmission system 100 can be varied by changing radius R1 and/or R2 of pulleys 104 and/or 106, respectively, as is well known in the art.

The majority of the power transmission by belt 102 is accomplished by the reciprocal contact between parallel surfaces 3 of adjacent links 1. Oblique surfaces 4 of links 1 are generally symmetrically defined by links 1, as shown in FIG. 1B.

The relative configuration of adjacent oblique surfaces 4 of adjacent links 1 facilitates the winding of belt 102 around pulleys 104 and 106 since adjacent oblique surfaces 4 of adjacent links 1 are out of contact with one another along straight line trajectory portions 108 and 110. However, such adjacent oblique surfaces 4 pivot toward and may at least partially contact one another when their associated links 1 exit straight line trajectory portions 108 and 110 and wind around pulleys 104 and 106. Also, adjacent parallel surfaces 3 pivot away from one another when their associated links 1 exit straight line trajectory portions 108 and 110 and wind around pulleys 104 and 106.

However, when adjacent links 1 assume a straight line trajectory along straight line trajectory portions 108 and 110, their respective oblique surfaces 4 are pivoted away from one another to the relative configuration shown in FIG. 1B.

A gradual surface configuration transition exists at the junction of parallel surfaces 3 and oblique surfaces 4 of each link 1. Link 1 may be made of a high-modulus polymer material.

Figure 2:
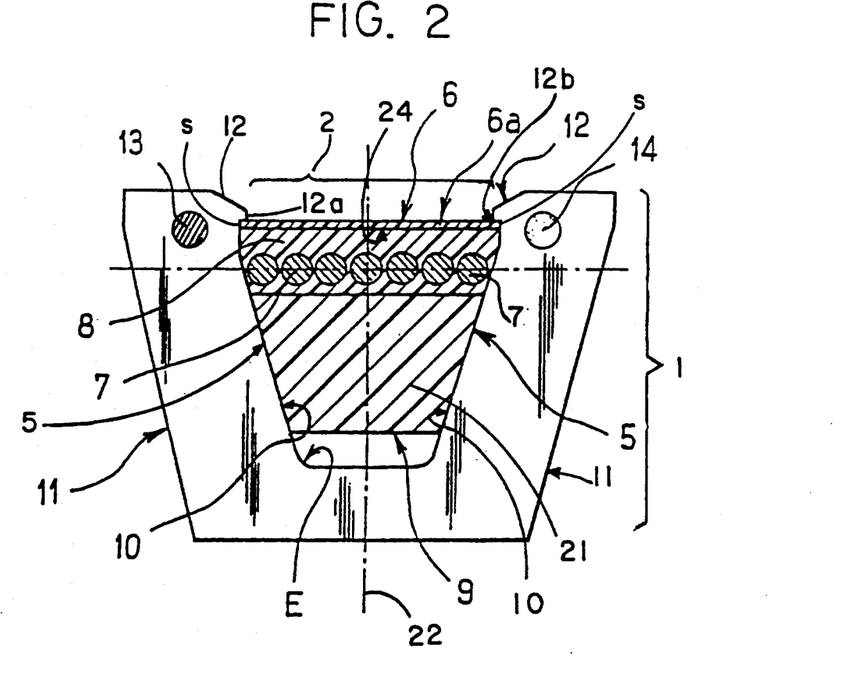
FIG. 2 is a front elevational view of the belt of the present invention, taken along line II—II of FIG. 1B.

FIG. 2 shows loop 2 which defines interior V-belt 21. V-belt 21 may have a trapezoidal cross-sectional configuration. Loop 2 defines oblique walls 5. Oblique walls 5 may either be "bare" (known commonly as a "raw-edge" type of belt) or oblique walls 5 may be covered by a fabric (known commonly as a "covered" type of belt). Oblique walls 5 are configured and positioned to be in contact with interior walls 10 of links 1. Exterior surface 6 of link 1 defines a large base area of loop 2.

Reinforcement elements 7 are positioned within elastomer compound base 8. Reinforcement elements 7 are, frequently, constructed of a high-modulus textile material. Reinforcement elements 7 are intimately bonded to elastomer compound base 8 by physico-chemical or physio-chemical means. Reinforcement elements 7 are, also, bonded to elements that are resistant to transverse compression and which extend to small base 9 of V-belt 21. Reinforcement elements 7 may comprise a neutral fiber of V-belt 21.

The oblique walls 5, of each link 1, that are wound around the pulleys 104 and 106, are in contact with their respective surfaces 10 of each respective link 1. Also, when links 1 are being wound around pulleys 104 and 106, exterior oblique surfaces 11 are in direct contact with the respective flanges of pulleys 104 and 106. The angle that exterior oblique surfaces 11 form relative to line 22 is not necessarily the same as the angle that interior surfaces 10 form relative, also, to line 22.

Links 1 include lateral staples, or flanges, 12. Staples 12 are positioned on either side of and in contact with exterior surface 6 of loop 2. The separation between edges 12a and 12b along surface 6 is selected based on the elasticity of the particular V-belt 21 over which the particular staple 12 will be positioned. Such separation is selected such that each link 1 can be forcibly engaged over V-belt 21 during assembly of link 1 onto loop 2.

After assembly of belt 102, the very small surfaces, of lateral staple 12 that contact exterior surface 6 prevent link 1 from falling out of engagement with V-belt 21. Such disengagement of link 1 from V-belt 21 is prevented even when link 1 is positioned and moving along straight line trajectory portions 108 and 110. Moreover, such disengagement of link 1 from V-belt 21 is prevented even when a portion of belt 102 is slack. Belt 102 is considered "slack" when adjacent links 1 are not in contact with one another. Experience has shown that it is preferable to have coating 6a on exterior surface 6. Coating 6a, preferably, has a low coefficient of friction relative to the surface of staple 12 in which it is in contact. Coating 6a may be advantageously composed of a very high molecular weight polyethylene film or ethylene polytetrafluoride.

Each link 1, preferably, defines centering pins 13 and cavities 14. A centering pin 13 of one link 1 is configured to be received within a corresponding cavity 14 of an adjacent link 1. Centering pin 13 and cavity 14 form a guiding device. Employment of centering pin 13 and cavity 14 as a guiding device does not affect the contact that occurs between interior surfaces 10 of link 1 and oblique walls 5 of loop 2.

The contact pressure against interior surfaces 10 and oblique walls 5 may vary such that a very rapid variation of stresses within belt 102 may occur during passage of belt 102 from either of straight line trajectory portions 108 and 110 to one of pulleys 104 and 106. With the present invention, the contact pressure exerted between interior surfaces 10 and oblique walls 5, which remain in generally permanent contact with one another, is continuous. With a conventional V-belt not employing links such as links 1, however, each point of such a belt is only periodically in contact with the flanges of the pulleys.

Since the imaginary original lines, or predicted path of travel of links 1, coincide with the region of the neutral fiber adjacent reinforcement 7, no separation between constituent materials is necessary during operation.

Micro-displacements can occur in the zone of, and between, lateral staples 12 and exterior surface 6. Such micro-displacements can occur because parallel surfaces 3 pivot away from one another along those portions of belt 102 that are wound around pulleys 104 and 106. Further, the length of surface 6 increases along those portions of belt 102 that are wound around pulleys 104 and 106 in contrast to those portions of belt 102 that are positioned along straight line trajectory portions 108 and 110. For this reason, coating or covering 6a, which has a low coefficient of friction, is considered necessary to allow for such micro-displacements between staples 12 and surface 6. However, both surface 6 and coating or covering 6a must retain a degree of deformability that is compatible with the flexing of belt 102.

Below the neutral fiber, in the zone of the elements that are resistant to transverse compression, the tapered shape of oblique surfaces 4 reduces the contact surface between them and loop 2, to a fraction of the surface of belt 102 which is elastically deformable in flexure.

During the winding of belt 102 around pulleys 104 and 106, adjacent oblique surfaces 4 of adjacent links 1 move, or pivot, toward one another. Such movement, in turn, causes a volumetric compression of the portion of loop 2 that is located between the neutral fiber of reinforcement 7 and small base 9.

Loop 2 may be a conventional V-belt of standardized dimensions. Such a V-belt may be used for conventional industrial or automobile applications. When such a conventional V-belt is employed as loop 2 such a belt may accept stresses that are significantly higher than the maximum stresses specified when such belts are used for conventional purposes. Therefore, belt 102 may be used in applications requiring much higher mechanical power transfer than possible with conventional belts. Belt 102 may experience surface stresses that are very much higher than those stresses experienced by conventional belts in typical known applications. It has been shown that power transmitted through belt 102 is distributed such that about one-third of the tension within belt 102 is transmitted by V-belt 21 of loop 2. Two-thirds of the tension within belt 102 is transmitted by and through the reciprocal contact between adjacent links 1. With belt 102 of the present invention, the stresses in belt 102 are much more evenly distributed due to the compression of, generally, the entire surface area of oblique walls 5 of V-belt 21.

Also, compressive forces, generally of the same order of magnitude as those applied to oblique walls 5, are exerted in an analogous manner on exterior oblique surfaces 11 of link 1. Such compressive forces on exterior oblique surfaces 11 cause surfaces 11 to become somewhat flattened by contact with the flanges of the pulleys.

The risks of high alternating stresses in zone E (shown in FIG. 2), when the magnitude of such stresses are calculated by the finite element method as described in French Publication No. 2625783, are significantly reduced by the present invention due to the utilization by the present invention of loop 2 that is in the form of V-belt 21. The employment of such a loop 2 by the present invention is why the mechanical power transmitted by belt 102 can be much higher than possible when using conventional belts.

Figure 3A:
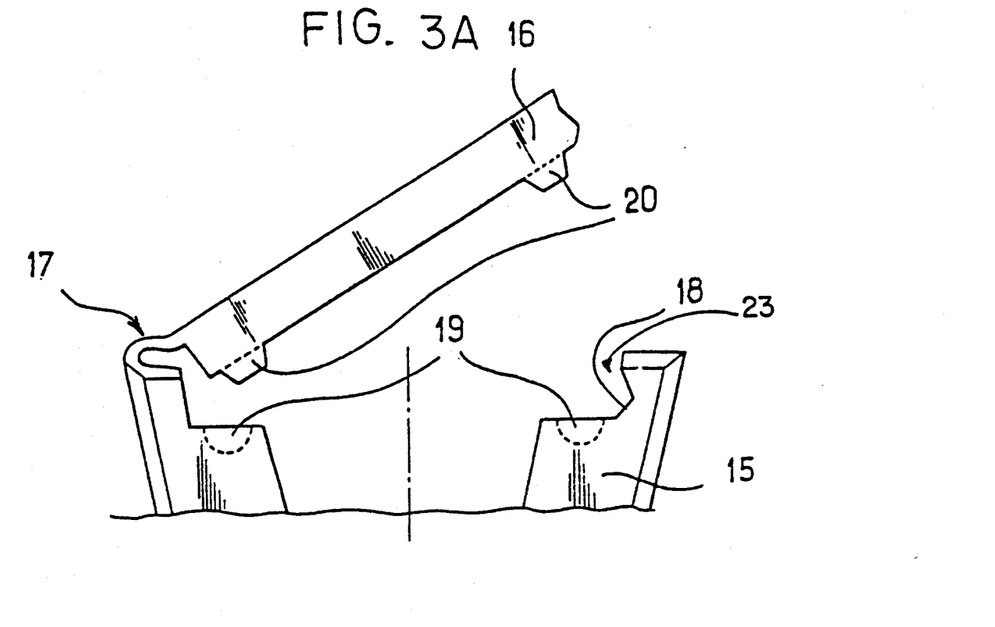
FIG. 3A is a fragmentary front elevational view of a closable link of the present invention.
Figure 3B:
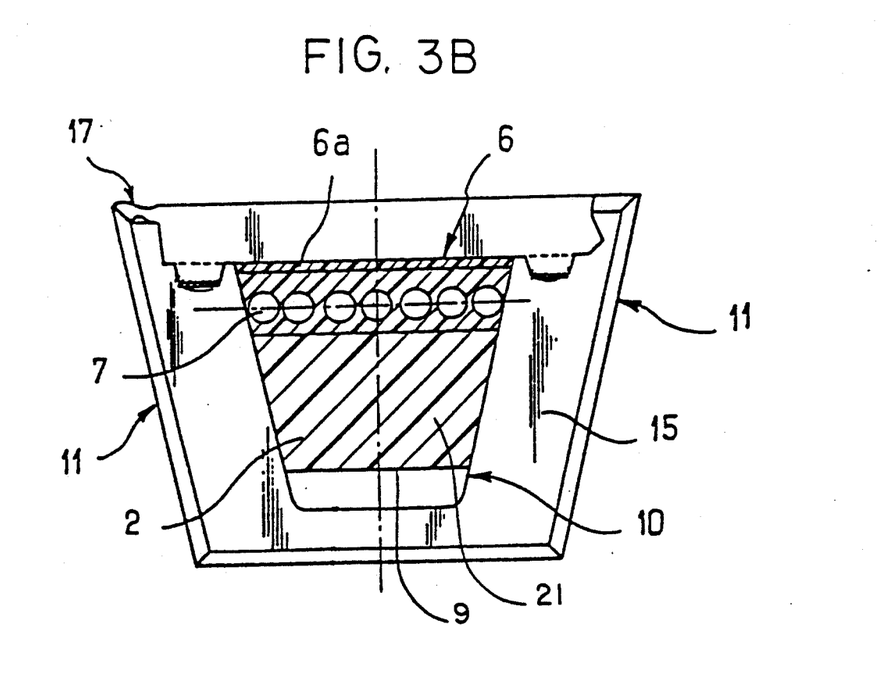
FIG. 3B is a front elevational view, partially in section, of an embodiment of the belt of the present invention that employs the closable link shown in FIG. 3A.

FIGS. 3A and 3B show another embodiment of the present invention. Closed, or closable, link 15 further minimizes the risk of alternating fatigue due to stresses within the belt.

Closable link 15 is engaged with loop 2 in a different manner than is link 1. Closable link 15 is, merely, positioned around a portion of loop 2, when strap 16 is in the open position as shown in FIG. 3A. Link 1, on the other hand, may be engaged or snapped, over loop 2 only by forcing staples 12 over exterior surface 6 of loop 2. Strap 16 is articulately connected to link 15 by hinge 17. Hinge 17 permits strap 16 to be closed over loop 2. FIG. 3A shows closable link 15 with strap 16 opened. FIG. 3B shows link 15 in place on loop 2 with strap 16 closed. Strap 16 is held in the closed position, for example, by notch 23 defined by edge 18.

Preferably, cavities 19 are formed in the body of closable link 15. Cavities 19 are configured to receive their corresponding lugs 20 that are on strap 16. Other arrangements of cavities 19 and lugs 20 are possible. For example, cavities 19 may be formed in strap 16 and lugs 20 may be located on the body of closable link 15. Also, at least one cavity 19 and at least one lug 20 may each be located on each of strap 16 and lug 20.

The exterior contour of each of links 1 and 15 is symmetrical once installed on loop 2. Therefore, link 1 and 15 may be assembled in any desired and functional orientation on loop 2.

Closable link 15 defines somewhat of a beam that is, under optimum conditions, resistant to compression exerted on exterior oblique surfaces 11. Generally, the lower portion of closable link 15 is not as thick as the thickness between the oblique surfaces 11 and interior surfaces 10, on account of the existence of the oblique faces.

Belt 102 may be used in the same applications as would a conventional, wide V-belt. With the employment of belt 102, transverse compression reinforcement is provided by the links 1 and 15 that are positioned external to loop 2.

A preferred fabrication process for belt 102 includes the initial step of the fabrication of links 1 and/or links 15. Such fabrication may take place by mass production molding of a composite polymer material that is reinforced with short fibers.

V-belt 21 is, preferably, formed by the superimposition of reinforcement element 7 around a mandrel. Such reinforcement element 7 is preferably embedded in polymer or elastomer compound base 8. Polymer, or elastomer, compound base 8 is intimately bonded, preferably by physico-chemical, or physio-chemical, adherence to reinforcement element 7. Reinforcement element 7, preferably, consists of wire or short fibers of high modulus material such as, preferably, textile material. Also, polymer or elastomer compound base 8 is intimately bonded to the compression resistant element which extends downward from the neutral fiber reinforcement adjacent element 7 of loop 2. The portion of loop 2 that includes the compression resistance elements may be formed by the stacking of layers of cord coated with polymer compound. Also, that portion may be formed by stacking sheets of polymer compound that are reinforced by oriented short fibers. Such reinforcing ensures the transverse rigidity necessary for the V-shaped belt 21 of loop 2.

A belt covering, comprising a material having a low coefficient of friction such as very high molecular weight polyethylene or ethylene polytetrafluoride may be positioned around the exterior of loop 2. The covering may be intimately bonded by physico-chemical, or physio-chemical, adherence to large base 24 of loop 2. Such physico-chemical or physio-chemical, adherence may be performed by vulcanization. An appropriate guide process may be employed to ensure the assembly of either of links 1 or 15 on loop 2. Such a process may be employed irrespective of whether the walls of loop 2 are covered or bare. In the case of closable links 15, the closing of straps 16 is followed, if necessary, by a continuous heat sealing process along the two lines defined by the plurality of lugs 13 of the closable links 15. Such sealing may be performed by ultrasound, by a cyanoacrylate adhesive process or any other similar process.

The number of links 1 and/or 15 mounted on loop 2, for a given length of belt 102, is checked to make certain that there is a specified amount of "play", or slack, in belt 102. Such slack should be within specified maximum and minimum tolerances when belt 102 is disposed about pulleys 104 and 106. The slack is absorbed when belt 102 winds around pulleys 104 and 106 and when belt 102 assumes a position along straight line trajectory portions 108 and 110.

Belt 102 operates dry, that is without lubrication. Belt 102 can provide power transmission capabilities in a compact form. Such power transmission capabilities are significantly greater than those capabilities possible if a conventional V-belt alone were employed to transmit the power without the use of links 1 and/or 15. In fact, belt 102 may provide an increase in power transmission capabilities by a factor of almost three over the power transmission capabilities of conventional V-belts.

The present invention provides the designers of power transmission systems with a high-performance, flexible transmission element that does not require delicate manufacturing and/or installation techniques or the employment of complex new technologies. The present invention employs components whose manufacturing processes are familiar and reliable and which manufacturing processes require only limited tooling irrespective of the lengths of the transmission elements to be fabricated.

Figure 4:
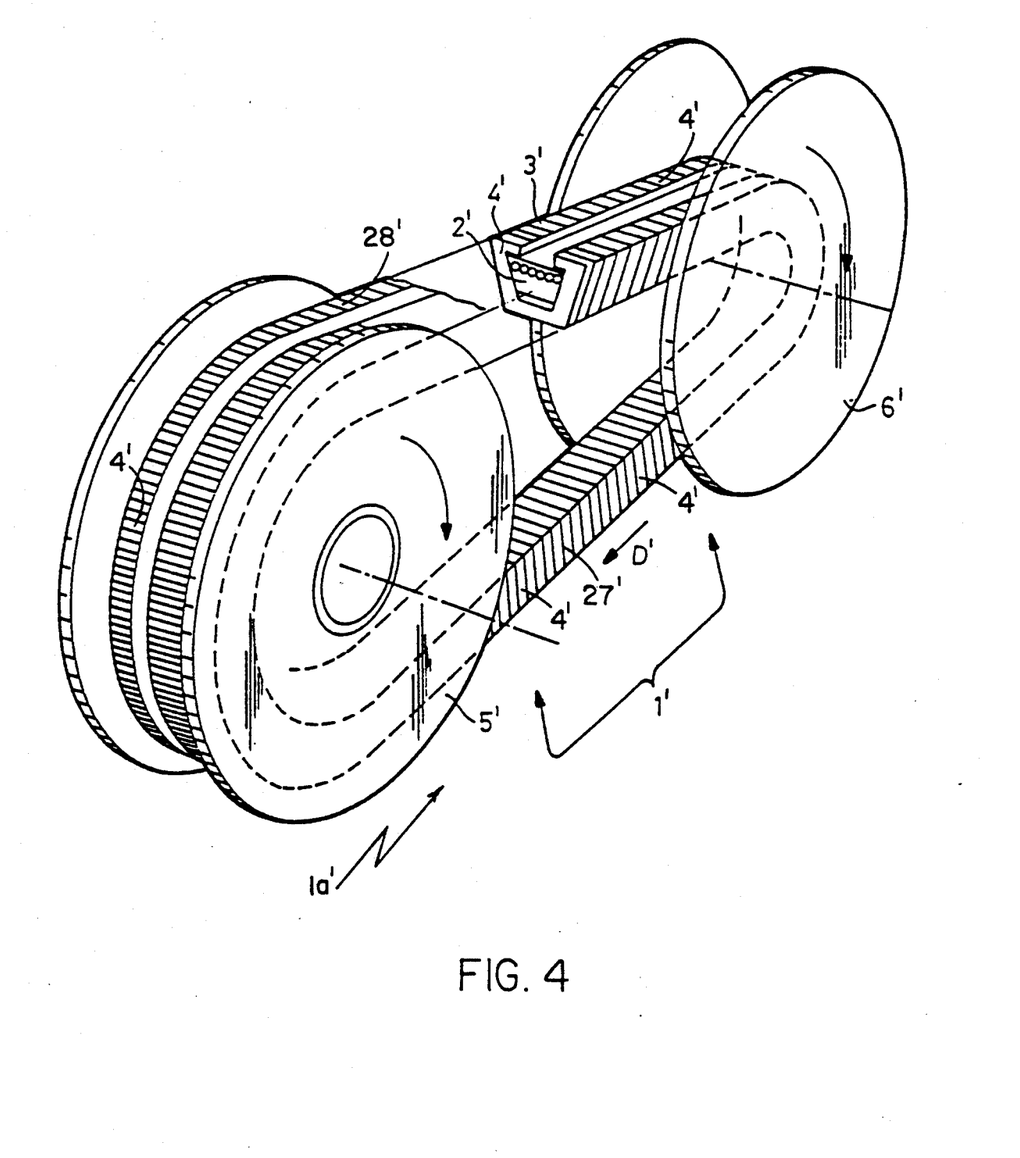
FIG. 4 is a perspective view showing the flexible belt of the present invention mechanically connected between two pulleys of a mechanical transmission wherein the flexible belt and transmission operate by dry mechanical adherence.

FIG. 4 shows power transmission system 1a', which includes mechanical power transmission belt 1'. Belt 1' is employed as a flexible mechanical power transmission belt. Belt 1' includes loop 2' which is preferable an endless loop. Belt 1' is, preferably, at least partially concealed by covering fabric 3'. Loop 2' is partially enclosed by rigid links 4'. In other words, a plurality of links 4' are positioned on and at least partially surround loop 2'. The disclosed stacking or positioning, of links 4' on loop 2' permits belt 1' to transmit power from drive pulley 6' to receiver pulley 5', essentially, by the reciprocal thrust of the links 4'. In other words, drive pulley 6' supplies mechanical power to the links 4' that are in immediate contact, through fabric 3', with drive pulley 6'. Those links 4' that are in immediate contact with drive pulley 6', through fabric 3', transfer the mechanical power through the stack of links 4' in the direction of arrow D'. Transfer of mechanical power through the stack of links 4' occurs by reciprocal, physical contact between parallel surfaces 7' (shown in FIG. 5) of adjacent links 4'. In other words, the links 4' in immediate contact with drive pulley 6' transfer power by applying a force on the first adjacent link 4' positioned along, generally, straight belt portion 27'. That first link 4', in turn, pushes on the next adjacent link 4' in the direction of arrow D'. Such reciprocal pushing of adjacent links 4' in the direction of arrow D' is generally continuous along the entire extent of belt portion 27'. The stack of rigid links 4' along belt portion 27', in turn, transfers the mechanical power therein to the links 4' that are in immediate contact, through fabric 3', with receiver pulley 5'. Those links 4' in immediate contact through fabric 3', with receiver pulley 5' then transfer the mechanical power to receiver pulley 5'.

With such mechanical power transmission occurring through links 4', loop 2' is used exclusively for the guidance and support of links 4', even though loop 2' is held tightly between pulleys 5' and 6'.

In contrast, the use of a conventional V-belt were to be used in place of belt 1', such a conventional V-belt would transfer mechanical power by exerting a force from drive pulley 6' to receiver pulley 5' by a tension differential between a driving portion of the conventional V-belt and by a slack portion of the conventional V-belt. With such a conventional V-belt, the driving portion of the conventional V-belt would be under high tension and the slack portion of the conventional V-belt would be under low tension. If such a conventional V-belt were employed in lieu of belt 1' of the present invention, the slack portion of the conventional V-belt would correspond to belt portion 27' and the driving portion of the conventional V-belt would correspond to, generally, straight belt portion 28'. Belt 1' may function somewhat as the equivalent of a combination of these two types of operations. In other words, belt 1' may exhibit properties similar to a combination, or hybrid, of the high and low tension functions of the above described conventional V-belt.

Receiver pulley 5' and drive pulley 6' may be a part of a variable ratio transmission system. With such a variable ratio transmission system, one flange of at least one of drive pulley 6' and receiver pulley 5' is axially displaceable relative to the other flange of the same pulley. The specific means for accomplishing such axial displacement is well known to those of ordinary skill in the art. Such variable ratio systems may employ known drive and/or receiver pulleys that have conical belt engagement surfaces that provide a variety of diameters of the pulley over which the belt travels. It is possible to achieve an increase in operational performance of both fixed-ratio and variable-ratio transmission systems by employing a flexible belt, such as belt 1' according to the present invention. Fixed ratio transmission systems, typically, employ grooved pulleys having a constant width. In other words, in fixed-ratio systems, the separation between the flanges of the pulleys is constant since the flanges of each pulley are not relatively axially displaceable. Also, it is possible that such fixed-ratio systems may not employ conical belt engagement surfaces.

Figure 5:
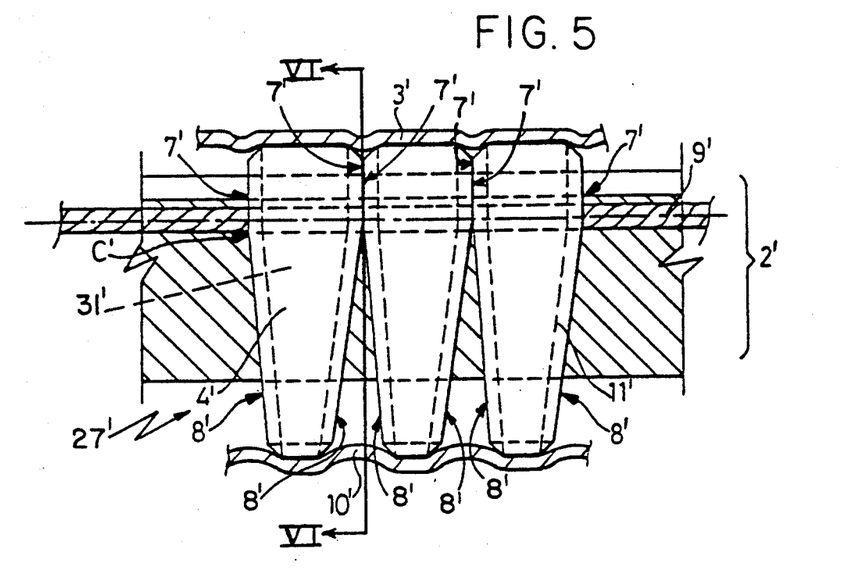
FIG. 5 is an inverted side elevational view, partially in section, showing several links of the belt of the present invention wherein the links are aligned on a portion of the loop.
Figure 7:
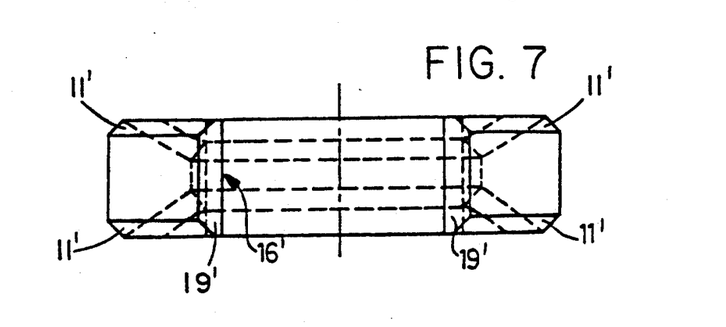
FIG. 7 is a top view of an individual link of the present invention.

FIG. 5 shows several links 4' positioned astride loop 2'. In FIG. 5' links 4' are shown positioned laterally along the straight line trajectory of belt portion 27'. Thus, the fragment of belt portion 27' depicted in FIG. 5 is shown inverted from the orientation of belt portion 27' as shown in FIG. 7. The power transmission from drive pulley 6' to receiver pulley 5' is achieved, for the most part, by the reciprocal thrust, or contact, between adjacent pairs of links 4' at adjacent parallel surfaces 7'.

Oblique surfaces 8' are, generally, symmetrically defined by each link 4'. The relative configuration of adjacent oblique surfaces 8', of adjacent links 4', facilitates the winding of belt 1' around pulleys 5' and 6' since adjacent oblique surfaces 8' pivot toward one another when their associated links 4' are wound around pulleys 5' and 6'. However, when adjacent links 4' assume a straight line trajectory, such as those rigid links 4' positioned along belt portions 27' and 28', their respective oblique surfaces 8' are pivoted away from one another to the relative configuration as shown in FIG. 5.

In another embodiment of the present invention (not shown), only one oblique surface 8' is provided for each link 4'. The other surface of such link 4' then has one continuous and, generally, straight surface 7' extending from generally the top to the bottom of such rigid link 4'.

As portions of belt 1' move from a straight line trajectory, such as along belt portions 27' and 28', to a curved trajectory, such as when wound around one of pulleys 5' and 6', a displacement of loop 2' may occur in the vicinity of contact zone C' between two adjacent links 4'. Links 4' may be made of reinforced, high-modulus polymer materials or may be made of metal.

An important feature of the present invention is the construction of loop 2'. Loop 2' may define a V-belt 31'. The term "V-belt" refers to a belt that may be in the shape of a "V" or a trapezoid or truncated "V". V-belt 31' may be of conventional, composite structure Loop 2' may also include traction layer 9'. Traction layer 9' may be formed of cables and/or high-modulus twisted textile fibers. In one preferred embodiment of the present invention, traction layer 9' is formed of aramid fibers. The aramid fibers of traction layer 9' may be treated so that they are intimately bonded to elastomer compound base 13' (see FIG. 6) of V-belt 31'.

Surrounding, or covering, fabric 3' is shown positioned partially on the stack of links 4' in FIG. 5. The use of fabric 3' in the present invention may necessitate the employment of bevels 11' on generally each of the peripheral surfaces of links 4'. Bevels 11' allow for the deformability of fabric 3' in the vicinity of zone 10' during passage of links 4' from a curved trajectory, when wound on one of pulleys 5' and 6', to a straight line trajectory, such as along belt portions 27' and 28'. Adjacent links 4' pivot on one another in the vicinity of contact zone C' as the adjacent links 4' move between straight and curved trajectories. As a pair of adjacent links 4' move from a straight trajectory to a curved trajectory, adjacent parallel surfaces 7' pivot away from one another and adjacent oblique surfaces 8' pivot toward one another. On the other hand, as adjacent links 4' move from a curved trajectory to a straight trajectory, adjacent parallel surfaces 7' pivot toward and into contact with one another and adjacent oblique surfaces 8' pivot away from one another.

To facilitate such relative movement between adjacent links 4', fabric 3', which consists of an elastic fabric coated with an elastomer compound, is slackened longitudinally in the vicinity of zone 10'. Fabric 3', is also in contact with the front surface of link 4'. The portions of fabric 3' in contact with bevels 11' are able to conform, generally, to the outer contour of bevels 11' due to the simultaneous adherization and vulcanization of the elastomer compound used to impregnate, or coat, the elastic fabric that forms fabric 3'.

Fabric 3', may advantageously be oriented obliquely relative to composite V-belt 31'. Also, fabric 3' may be formed in a single thickness or in multiple thicknesses.

Figure 6:
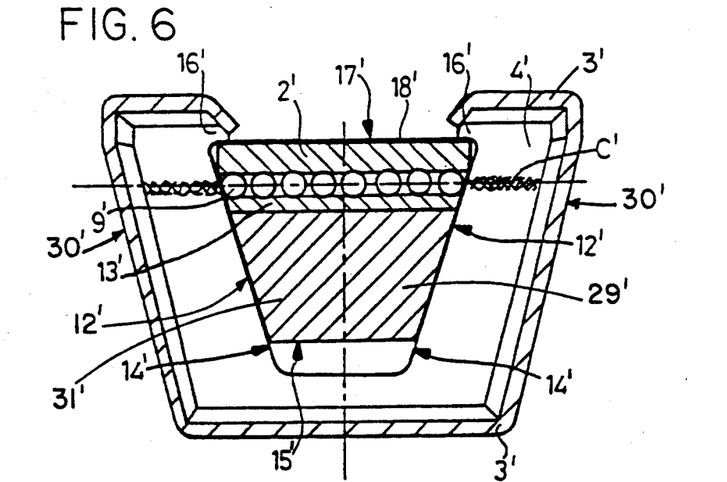
FIG. 6 is a front elevational view, partially in section, of the belt of the present invention, taken along line VI—VI of FIG. 5.

Loop 2' may define a covered V-belt 31'. However, as shown in FIG. 6, loop 2' defines a raw-edged V-belt 31'. When V-belt 31' has such raw edges, oblique walls 12' are formed by cutting a cylindrical sleeve of the material used to form V-belt 31'. The cut cylindrical sleeve may then be positioned adjacent and attached to a very long traction layer 9'. Traction layer 9' may be embedded in elastomer compound base 13'.

Traction layer 9' may consist of a cord, twisted aramid fibers or another high-modulus textile material that is preferable chemically treated to achieve an intimate bonding with elastomer compound base 13'. Interior surfaces 14', of link 4', are positioned, substantially, in contact with oblique walls 12' of loop 2' as shown in FIG. 6.

Loop 2' may be reinforced in trapezoidal-shaped zone 29' between traction layer 9' and small base 15'. Such reinforcement may be either by textile plys or by short fibers. Such reinforcement is provided to resist the compression of the belt due to the "wedge effect." Such a "wedge effect" may occur due to forces applied on oblique walls 12' by interior surfaces 14'. Such a "wedge effect" may occur to the links 4' that are wound on a pulley 5' or 6'. The reinforced portion of loop 2' may be longitudinally elastic, or resilient. When belt 1' is wound around a pulley, the reinforced portion of zone 29' is somewhat flattened against interior surfaces 14' of links 4'. Since links 4' include angled, or bevelled, interior surfaces 14', as shown in FIG. 6, portions of interior surfaces 14' may participate in the volumetric compression of the portion of loop 2' located between the neutral fiber at the level of, or near, traction layer 9' and small base 15'.

Stresses that are significantly higher than those encountered during the current usage of conventional V-belts can be exerted by the rigid, interior surfaces 14' of links 4' along the curved trajectory of belt portions around the pulleys 5' and 6'. Interior surfaces 14' of links 4', preferably, do not separate from oblique walls 12' when links 4' move in their straight line trajectory along belt portions 27' and 28'. Rather, interior surfaces 14' remain in contact with oblique walls 12', without applying any stress to loop 2' during such straight line trajectory movement.

However, those portions of loop 2' that are wound on a pulley encounter pressures or forces that are of the same order of magnitude as those applied to the sides 30' of the links. Such pressures or forces may be due to the compression of loop 2', such as may be due to the "wedge effect", as described above. Such pressures are exerted in a similar manner as those applied to conventional V-belts. Such pressures or forces, are exerted through sides 30' of links 4' due to force applied to links 4' by contact with the flanges of the pulleys.

The risks of alternating stresses are significantly reduced with the present invention due to the utilization of a loop 2' that is in the form of V-belt 31'. The employment of such a V-belt 31' permits the mechanical powers transmitted by belt 1' to be much higher than those transmitted with a standard V-belt, as explained in greater detail below.

Links 4' remain stacked and under compression at parallel surfaces 7' in the vicinity of contact zone C' along belt portion 27'. However, belt portion 28' is somewhat slack. Under such circumstances, adjacent links 4' of belt portion 28' may not necessarily be in contact with one another. Therefore, links 4' of belt portion 28' may become separated from loop 2' and may even become totally disengaged from loop 2' due to the effects of gravity.

To eliminate the risk of separation of links 4' from loop 2', lateral staples 16' are fitted on links 4'. These staples 16' partially enclose large base 17' of loop 2' to secure links 4' to loop 2'. Links 4' are assembled with loop 2' by, preferably, forcing links 4' over the naturally elastic or resilient loop 2' which loop 2' is not reinforced above the neutral fiber between traction layer 9' and large base 17'.

As portions of belt 1' move between the curved trajectory and the straight line trajectory, the part of loop 2' between traction layer 9' and large base 17' is subjected to an elastic, or resilient, variation of length. However, links 4' do not, similarly, exhibit such a variation in length in the vicinity of lateral staples 16'. Therefore, longitudinal micro-slippage can occur between loop 2' and lateral staples 16'. Because of the possible slippage, it is advantageous to provide large base 17' with coating 18'. Coating 18', preferably, has a low coefficient of friction. Such a coating 18' may be, for example, a thin film of very high molecular weight polyethylene or ethylene polytetrafluoride. Thus, the coefficient of friction between large base 17' and lateral staples 16' is low.

Fabric 3' may cover all, or only a portion, of the exterior surfaces of links 4'. Fabric 3' may be fixed to sides 30' of links 4' by a thermal treatment subsequent to assembly of belt 1'. Depending on the application for which belt 1' is to be used, the continuity of fabric 3' can be interrupted adjacent to each lateral staple 16' as shown in FIG. 6 or continued to thereby cover large base 17'. However, fabric 3' may, possibly, not adhere to large base 17' because coating 18' has a low coefficient of friction.

FIG. 7 is a top view of one link 4'. FIG. 7 shows the presence of bevels 11' on the extremities of link 4'. The purpose of bevels 11' is to allow deformability of fabric 3'. Upper portions 19' of bevels 11' also cover the area in the vicinity of lateral staples 16'. Upper portions 19' help to keep the interrupted edge of fabric 3' affixed to the links 4', particularly when centrifugal force is exerted as belt 1' winds around pulleys 5' and 6'. For applications at relatively low speeds, fabric 3' can be closed over itself by mutually engaged, overlapping portions. The mutual fastening of the overlapping portions may occur in the vicinity of coating 18' of large base 17'. Since fabric 3' may not be intimately bonded to coating 18', micro-displacements between fabric 3' and links 4' may occur.

Figure 8A:
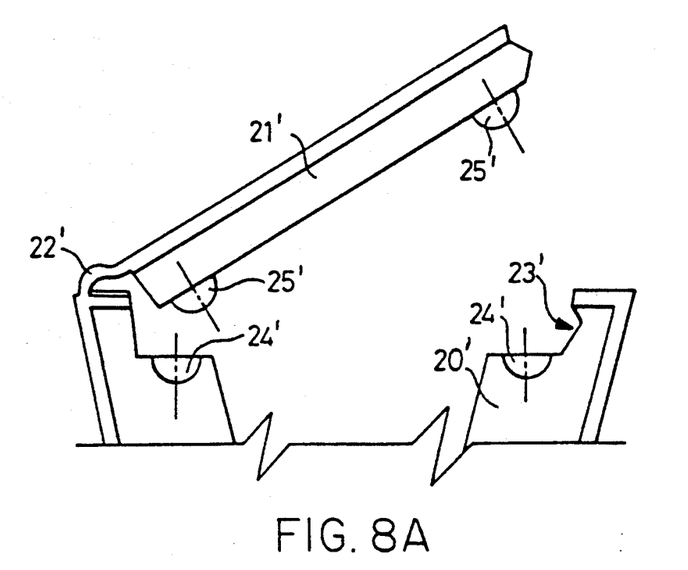
FIG. 8A is a fragmentary front elevational view of a closable link of the present invention.
Figure 8B:
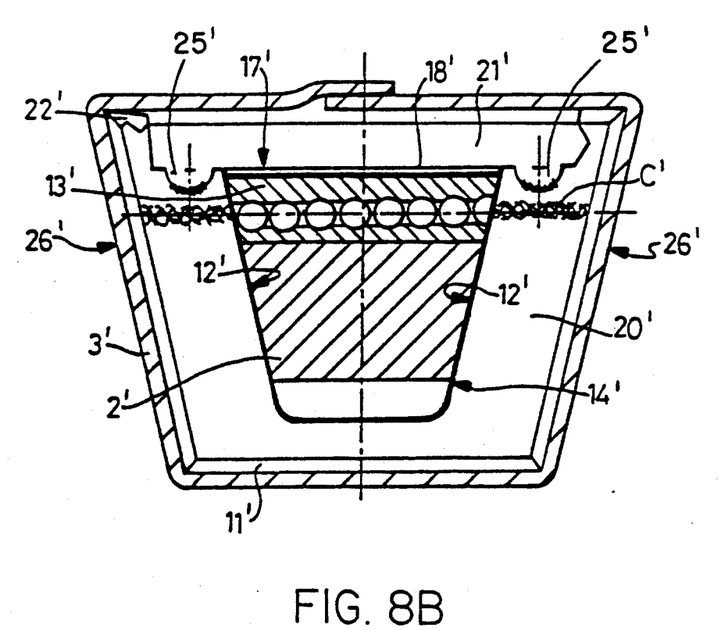
FIG. 8B is a front elevational view, partially in section, of an embodiment of the belt of the present invention that employs the closable link shown in FIG. 8A.

FIGS. 8A and 8B show another embodiment of link 4' of the present invention. In this embodiment, closable, or closed, link 20' includes strap 21'. Strap 21', when closed, causes closable link 20' to generally surround an entire cross section of loop 2'. This embodiment of the present invention minimizes the risks of fatigue due to the alternating stresses that may be localized in the bevelled, or angled, portions of links 4'. Such alternating stresses may occur at points in the non-closable links 4' which are open in a "U" shape, shown in FIGS. 4–7 and described above, where the thickness is reduced.

FIG. 8A is a partial view of closable link 20' in the open position. FIG. 8B shows closable link 20' in the closed position. As shown in FIG. 8B, strap 21' is positioned adjacent loop 2' when strap 21' is in the closed position. Closable link 20' and strap 21' are connected together in an articulated manner by hinge 22'. Hinge 22' is produced during the molding of closable link 20'.

A system for assembling the components of belt 1' should, preferably, be capable of being automated to achieve a high rate of production of belts 1' that employ closable link 20'. In such automated systems, strap 21' is closed by an appropriate guide element after the associated closable link 20' is installed astride loop 2'. Edge 23', that may be temporarily clipped, is provided to hold the end of strap 21' therein when strap 21' is in the closed position as shown in FIG. 8B. Such a closing of strap 21' is provided by the engagement of corresponding lugs 25', of strap 21' in matching cavities 24'.

Three arrangements of lugs 25' and cavities 24' are possible. In one arrangement, all of cavities 24' are formed in the body of closable, or closed, link 20', and all of matching lugs 25' are positioned on strap 21'. In another arrangement, all of cavities 24' are formed in strap 21' and all of matching lugs 25' are positioned on the body of closable link 20'. In a third arrangement, at least one each of cavities 24' and matching lugs 25' are on the body of closable link 20' and at least one each of cavities 24' and matching lugs 25' are on strap 21'.

A continuous heat-sealing process using e.g. ultrasound, or an adhesive fastening process using e.g. cyanoacrylate adhesive, or any similar assembly process may be used to finally close straps 21' over loop 2'.

Closable link 20', as shown in FIG. 8B, is configured to resist alternating fatigue. Such resistance to alternating fatigue is desirable since closable link 20' may possibly receive high compression stresses on its interior surfaces 14' and oblique walls 12'.

During assembly, the number of links 4' or closed links 20' is selected, for a given length of belt 1', to provide a belt that may have some play after the belt is installed between two pulleys. Such play may be absorbed, or compensated for, during the passage of belt 1' between the lowest winding radii on the pulleys and the portion of belt travel along the two straight line trajectories. Because of the rocking of adjacent links in the vicinity of contact zones C', the number of links 4' or closable links 20' required to construct a belt 1' for a given power transmission 1a, (see FIG. 4), is greater than the number of links 4' required to construct a belt 1' of a length that would be required when power transmission 1a' is of a circular configuration.

Also, allowance for play in belt 1' must be made during the installation of fabric 3' over links 4' or 20'. To encourage the micro-displacements that occur between loop 2' and straps 21', large base 17' of loop 2' is, preferably, provided with coating 18'. The coefficient of friction between loop 2' and straps 21' is, generally, lowered because of coating 18'.

Closable links 20' are, preferably, covered with fabric 3' to improve the friction of exterior oblique surfaces 26' against the flanges of pulleys 5' and 6'. Fabric 3' is, preferably, glued only to exterior oblique surfaces 26'. The presence of fabric 3' is not essential on the top and bottom bases of the trapezoid-shaped closable link 20'. However, the elasticity of fabric 3', contributes to balancing the play between adjacent links 20'. Such elasticity may occur due to a partial bonding by adhesive to closable link 20' along bevels 11'. Bevels 11' run along each of the corners of closable link 20'.

The inclusion of fabric 3' on closable link 20', also, may provide a certain amount of vibration damping during reciprocal rocking of adjacent closable links 20' in the vicinity of contact zone C'. Fabric 3' can be closed and made to adhere to itself through the reciprocal engagement of overlapping portions of adjacent strap 21', as shown in FIG. 8B.

A preferred process for the fabrication of belt 1' of the present invention includes two heat cycles for each component. Links 4' or closable links 20' are, initially, fabricated by molding. Such molding may be performed by injection molding techniques. When using such injection molding techniques, a closed mold having a large number of impressions may be employed. The material used for molding links 4' or 20' may, for example, include semi-aromatic polyamide that is, preferably, reinforced with short fibers. The number of the molded impressions can be on the order of two hundred to three hundred links for a flexible belt 1' having a developed length of about one meter.

The formation of loop 2' employs procedures that may be known. Such procedures may be those used for the formation of conventional covered V-belts or raw-edged V-belts.

In a variant that utilizes a "reversal", or "turning inside out" technique, a cylindrical sleeve of appropriate length is fabricated in a succession of layers. The first layer includes coating 18', having a low coefficient of friction. Such coating 18' may be made from a very high molecular weight polyethylene film or possibly ethylene polytetrafluoride. Elastomer compound base 13' may be located above and/or below traction layer 9'. The formation of traction layer 9' may be performed, for example, by using twisted aromatic polyamide fibers that have, preferably, been treated to ensure adherence with elastomer compound 13'. The layers may be reinforced by fabric or by short fibers before being arranged to form loop 2'. At this stage, loop 2' may be in the form of a cylindrical sleeve. Such a loop 2' is resistant to transversal compression. The elastomer compound base 13' and traction layer 9' thus formed is then vulcanized by pressurized heat treatment around an internal core. This process gives a smooth surface to coating 18'. Finally, the sleeve is cut into individual loops 2' that are then "turned inside out."

The assembly of links 4' and/or 20' on loop 2' is, necessarily, a mechanized operation because of the high number of components employed to make a single belt 1'. Lateral staples 16' of links 4' and/or 20' are forced over large base area 17' and traction layer 9' of loop 2'.

In the embodiment of the present invention that employs closable links 20', straps 21' are folded after assembly. The closing of straps 21' is made possible by the flexing of hinge 22'. Heat sealing or adhesive fastening of matching lugs 25' in cavities 24' may be performed by a continuous process, thereby making the assembly permanent.

Irrespective of whether links 4' or links 20' are employed, the above formed assembly is covered by fabric 3' after the prior deposition of a layer of adhesive on the surfaces to which fabric 3' is to be joined, if such adhesive is deemed to be necessary. The edges of fabric 3' are either partly folded back, or are overlapped to ensure closing. This complete assembly of the flexible belt is then enclosed in a mold to press fabric 3' in contact with the external surfaces of links 4' and 20', and bevels 11'. An appropriate heat treatment ensures bonding of fabric 3' to links 4' and/or 20', without damage to the previously vulcanized materials that form loop 2'.

The composite belt 1' that forms a flexible transmission belt according to the present invention can be used in the same manner as a conventional V-belt or as a wide belt for a mechanical power transmission. Belt 1' of the present invention has the following advantages over the transmission belts of the prior art:

1. The performance of belt 1' may be considered as a combination of the capabilities of thrust link transmissions that operate without lubrication and the capabilities of conventional V-belts;

2. The reciprocal contact between the oblique walls of the links and the loop helps to ensure the centering and alignment of the links.

3. The relative slip of the components experienced in thrust link transmissions is minimized by the mechanical adherence of the links against the deformable oblique walls of the loop;

4. The resulting flexible belt combines the mechanical adherence of conventional V-belts with the transversal incompressibility of flexible elements with rigid links;

5. The presence of the cover fabric, which is used for the mechanical adherence of the links against the flanges of the pulleys, forms an elastic connection between the links, thereby reducing the risk of vibration at annoying acoustical frequencies;

6. The separation, due to alternating fatigue, of the components of the loop is minimized by an improved distribution of stresses over a surface that remains in permanent contact with the link; and 7. The mass production of several sizes of links makes it possible to manufacture flexible elements in any desired original belt length, thereby making the production of such transmission belts, or elements, particularly economical.

Without going beyond the context of the invention, a technician skilled in the art can combine all shape and size variations to ensure an efficient transmission by flexible elements between two or more grooved pulleys.

In summary, one feature of the invention resides broadly in a transmission element for infinitely variable transmission, with transverse thrust links characterized by the fact that the endless core 2 is a V-belt with oblique walls 5 in contact with the interior surfaces 10 of the links in the shape of stirrups 1 or 15, surrounding said V-belt, their exterior oblique surfaces 11 forming the surface which comes in contact with the cheeks of the transmission pulleys.

Another feature of the invention resides broadly in a transmission element for infinitely variable transmission characterized by the fact that the endless core 2 is formed by a V-belt with covered oblique walls 5.

Yet another feature of the invention resides broadly in a transmission element for infinitely variable transmission characterized by the fact that the endless core 2 is formed by a V-belt with bare oblique walls 5.

A further feature of the invention resides broadly in a transmission element characterized by the fact that the endless core 2 is provided on its exterior surface 6 with a coating 6a having a low coefficient of friction, on which links in the form of stirrups 1 or 15 are supported during the straight-line trajectory on the slack side.

A yet further feature of the invention resides broadly in a transmission element characterized by the fact that the guide device for the links in the form of stirrups 1 or 15 is provided both by the existence of centering pins 13 and cavities 14 located near lateral staples 12 or cavities 19, and by the alignment of the interior surfaces 10 in contact against the oblique walls 5 of the endless core 2 constituted by a V-belt.

Yet another further feature of the invention resides broadly in a transmission element for infinitely variable transmission characterized by the fact that the links in the form of stirrups are constituted by closed stirrups 15' having a strap 16 which encloses the endless core 2 by engagement of the matching lugs 20 in the cavities 19.

An additional feature of the invention resides broadly in a transmission element for infinitely variable transmission characterized by the fact that the definitive closing of each of the closed stirrups 15 is done by heat-sealing or attachment by adhesive of the lugs 20 in the matching cavities 19.

Patent publications such as French Patent Publication No. 2,437,531 which is assigned to Varitrac AG, and European Patent Publication Nos. 0,242,263 and 0,395,227 which are both assigned to Hutchinson, each disclose belts with rigid transversal reinforcements elements. The reinforcement elements may be made of metal. The reinforcement elements cooperate together and also cooperate with a longitudinal traction armature. The reinforcement elements and the armature may be embedded in the elastomer base material of the belt.

Numerous patent publications, in particular several assigned to Van Doorne, such as U.S. Pat. No. 3,720,113; French Patent Publication No. 2,089,587; and European Patent Publication Nos. 0,000,802, 0,014,013 and 0,014,492 disclose solid belt assemblies that are mounted on a guide element.

A variant of such belts employs reinforced plastic rigid riders, or staples, that act as thrust links and operate without lubrication. Such belts are disclosed in French Patent Publication Nos. 2,536,486, and 2,527,723 and its Certificate of Continuation, French Patent Publication No. 2,536,487. All of these publications are assigned to Michelin. Additional variants of the belts described above are also disclosed in French Patent Publication No. 2,625,783 which is assigned to Caoutchouc Manufacture Et Plastiques.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicants' option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A continuously variable speed transmission comprising:
   a drive pulley;
   a driven pulley;
   each of said drive pulley and said driven pulley having conical surfaces to provide variable diameters thereof;

a transmission mechanism extending around each of said drive pulley and said driven pulley; said transmission mechanism comprising:

at least one endless flexible connecting element, said at least one endless flexible connecting element having an endless dimension;

said endless flexible connecting element defining a generally trapezoidal cross section generally perpendicular to the endless dimension, said cross-section having a first, oblique, side portion, a second, oblique, side portion spaced apart from and oblique to said first, oblique, side portion, a third side portion connecting said first, oblique, side portion to said second, oblique, side portion, and a fourth side portion parallel to said third side portion, said third side portion and said fourth side portion each having a width, said width of said fourth side portion being greater than said width of said third side portion;

a plurality of links mounted on said endless flexible connecting element;

each link of said plurality of links comprising a first oblique side part and a second oblique side part, said second oblique side part being oblique to and spaced apart from said first oblique side part to form groove means therebetween for receipt of said endless flexible connecting element therein, said first oblique side part having a first oblique inner surface disposed toward said groove and said second oblique side part having a second oblique inner surface disposed toward said groove, said first and said second oblique inner surfaces contacting said first and said second, oblique, side portions of said endless flexible connecting element, said groove having a base extending from said first oblique inner surface to said second oblique inner surface, said third side portion of said endless flexible connecting element being disposed towards said base;

said first, oblique, side portion and said second, oblique, side portion of said endless flexible connecting element substantially comprising the sole portions of said endless flexible connecting element for transmitting and receiving mechanical power; and said endless flexible connecting element being configured for transmitting and receiving substantially all mechanical power through said first and said second, oblique, side portions to and from said first and said second oblique inner surfaces of said links.

2. The transmission of claim 1, wherein:

each of said links define an opening in said fourth side portion, said opening being disposed away from said base of said groove, and said opening extending from a perimeter surface of said links to said link groove means; and at least a portion of said links define a generally trapezoidal exterior cross section.

3. The transmission of claim 2 further including strap means for covering said link opening.

4. The transmission of claim 3, further including:

hinge means for connecting said strap means to said links; and lock means for locking said strap means to said links.

5. The transmission of claim 1, wherein:

said endless flexible connecting element comprises a V-belt;

said cross-section has a thickness extending from said third side portion to said fourth side portion; and said thickness is at least about 80% of the width of said fourth side portion.

6. The transmission of claim 5, wherein:

each said link comprises one continuously integral piece having at least three side parts, said at least three side parts comprising said first side part, said second side part and said base, said at least three side parts defining at least a V-shaped groove for receipt of said endless flexible connecting element therein, and at least a portion of said V-shaped groove corresponds substantially to said trapezoidal cross-section of said endless flexible connecting element; and said third oblique side portion of said endless flexible connecting element is spaced apart from said base of said groove when said first and said second oblique side portions of said endless flexible connecting element are in contact with said first and said second oblique surfaces of said link.

7. The transmission of claim 6, wherein:

at least a portion of said link groove means is configured to correspond substantially to the cross-section of said endless flexible connecting element; and said transmission further comprises:

reinforcement means for reinforcing said endless flexible connecting element; and guide means for relatively positioning adjacent said links with respect to one another, said guide means defining a projection on one said link and a recess on an adjacent said link, said projection and said recess being relatively configured for said projection to be received within said recess.

8. A continuously variable speed transmission belt for a continuously variable speed transmission, said transmission having a drive pulley and a driven pulley, said transmission belt for extending movably around said drive pulley and said driven pulley, said drive pulley for driving said driven pulley by said transmission belt, said belt comprising:

a flexible loop of material;

said flexible loop having a substantially trapezoidal cross section;

a plurality of substantially rigid links mounted on said flexible loop;

said links each defining a cavity for receiving a portion of said flexible loop, said cavity being configured to correspond substantially to a portion of said flexible loop cross section;

said links each having a exterior perimeter surface defining an at least partially trapezoidal cross section, at least a portion of said exterior perimeter surface for contacting the drive pulley and the driven pulley when said belt is extended around said drive pulley and said driven pulley;

each said link having opposed contact surfaces connected to said exterior perimeter surface;

each said link contact surface for being in removable contact with an adjacent said contact surface of an adjacent said link;

each said link contact surface being configured to push said adjacent contact surface of said adjacent link to move said belt along the path of travel;

a flexible cover substantially surrounding and being disposed on at least said at least a portion of said exterior perimeter surface of each said link for contacting the drive pulley and the driven pulley; and said flexible cover extending generally continuously along generally the entire length of said belt.

9. The transmission belt of claim 8, further including:
reinforcement means for reinforcing said flexible loop; and
guide means for relatively positioning adjacent said links with respect to one another, said guide means defining a projection on one said link and a recess on an adjacent said link, and said projection and said recess being relatively configured for said projection to be received within said recess.

10. The transmission belt of claim 8, further including staple means for attaching said links to said flexible loop.

11. The transmission belt of claim 10, wherein:
said staple means is in contact with said flexible loop;
said flexible loop includes a coating in contact with said staple means; and
said coating provides a low coefficient of friction between said flexible loop and said staple means such that said staple means and said flexible loop are relatively slideable with one another when said transmission belt moves around said drive pulley and said driven pulley.

12. The transmission belt of claim 11, wherein:
said links define an opening extending from said exterior perimeter surface to said cavity; and
said transmission belt further includes strap means for covering each said opening of each said link.

13. The transmission belt of claim 12, wherein:
said strap means includes hinge means for movably connecting said strap means to said links;
said strap means includes lock means for locking said strap means to said links;
said flexible loop and each said link define a hole therebetween;
said links are transversely rigid;
said lock means comprises a lug and a corresponding recess;
each said strap means is connected to each said link by at least one of: a) a heat seal, and b) glue;
said flexible loop is quasi-inelastic;
said pulleys ar in contact with said links by dry adherence;
said flexible loop is substantially a V-belt; and
said links are substantially in the form of stirrups.

14. The transmission belt of claim 8, wherein:
said flexible cover comprises fabric and said fabric is an elastic fabric coated with elastomer.

15. A belt for a transmission having a drive pulley with a conical surface and a driven pulley with a conical surface, said belt for being disposed about each of aid drive pulley and said driven pulley, said belt comprising:
an endless flexible connecting element, said endless flexible connecting element having an endless dimension, and said endless flexible connecting element defining a generally trapezoidal cross section generally perpendicular to the endless dimension, said cross-section having a first, oblique, side potion, a second, oblique, side portion spaced apart from and oblique to said first, oblique, side portion, a third side portion connecting said first, oblique, side portion to said second, oblique, side portion, and a fourth side portion parallel to said third side portion, said third side portion and said fourth side portion each having a width, said width of said fourth side portion being greater than said width of said third side portion; and
a plurality of links mounted on said endless flexible connecting element;
each link of said plurality of links comprising a first oblique side part and a second oblique side part, said second oblique side part being oblique to and spaced apart from said first oblique side part to form groove means therebetween for receipt of said endless flexible connecting element therein, said first oblique side part having a first oblique inner surface disposed toward said groove and said second oblique side part having a second oblique inner surface disposed toward said groove, said first and said second oblique inner surfaces contacting said first and said second, oblique, side portions of said endless flexible connecting element, said groove having a base extending from said first oblique inner surface to said second oblique inner surface, said third side portion of said endless flexible connecting element being disposed towards said base;
said first, oblique, side portion and said second, oblique, side portion of said endless flexible connecting element substantially comprising the sole portions of said endless flexible connecting element for transmitting and receiving mechanical power; and
said endless flexible connecting element is configured for transmitting and receiving substantially all mechanical power through said first and said second, oblique, side portions to and from said first and said second inner surfaces of said links.

16. The belt according to claim 15, wherein said third side portion of said endless flexible connecting element is spaced apart form said base of said groove when said first and said second, oblique, side portions of said endless flexible connecting element are in contact with said first and said second oblique surfaces of said link.

17. The belt according to claim 16, wherein said endless flexible connecting element comprises a V-belt.

18. The belt according to claim 17, wherein said V-belt has a thickness extending from said third side portion to said fourth side portion, and said thickness of said V-belt is at least about 80% of the width of said fourth side portion.

19. A belt for a transmission having a drive pulley with a conical surface and a driven pulley with a conical surface, said belt for being disposed about each of said drive pulley and said driven pulley, said belt comprising:
a flexible loop of material;
a plurality of substantially rigid links mounted on said flexible loop;
said links each defining a cavity for receiving a portion of said flexible loop, said cavity being configured to correspond substantially to a portion of said flexible loop cross section;
said links each having an exterior perimeter surface defining an at least partially trapezoidal cross section, at least a portion of said exterior perimeter surface for contacting the drive pulley and the driven pulley when said belt is disposed about each of said pulleys;
each said link having opposed contact surfaces connected to said exterior perimeter surface;

each said link contact surface for being in removable contact with an adjacent said contact surface of an adjacent said link;

each said link contact surface being configured to push said adjacent contact surface of said adjacent link to move said belt along the path of travel;

a flexible cover disposed on at least said at least portion of said exterior perimeter surface for contacting the drive pulley and the driven pulley; and said flexible cover extending generally continuously along generally the entire length of said belt.

20. The belt according to claim 19, wherein said flexible cover comprises fabric.

* * * * *

UNITED STATES PATENT AND TRADEMARK OFFICE
CERTIFICATE OF CORRECTION

PATENT NO. : 5,147,253

DATED : September 15, 1992

INVENTOR(S) : Louis DOUHAIRET, Daniel PLAY, Roger TRINQUARD

It is certified that error appears in the above-identified patent and that said Letters Patent is hereby corrected as shown below:

In column 9, line 61, after 'FIG.', delete " 5' " and insert --5,--.

In column 13, line 45, after 'transmission', delete "1a," and insert --1a'--.

In column 16, line 7, before 'having', delete " 15' " and insert --15,--.

In column 19, line 45, Claim 13, after 'pulleys', delete "ar" and insert --are--.

In column 19, line 54, Claim 15, after 'of', delete "aid" and insert --said--.

In column 19, lines 62-63, Claim 15, after the first occurrence of 'side', delete "potion" and insert --portion--.

Signed and Sealed this

Second Day of November, 1993

Attest:

BRUCE LEHMAN

Attesting Officer — Commissioner of Patents and Trademarks